Sept. 3, 1946.         E. R. KOPPEL         2,407,083
                          CHUCK
              Filed March 11, 1944        4 Sheets-Sheet 1
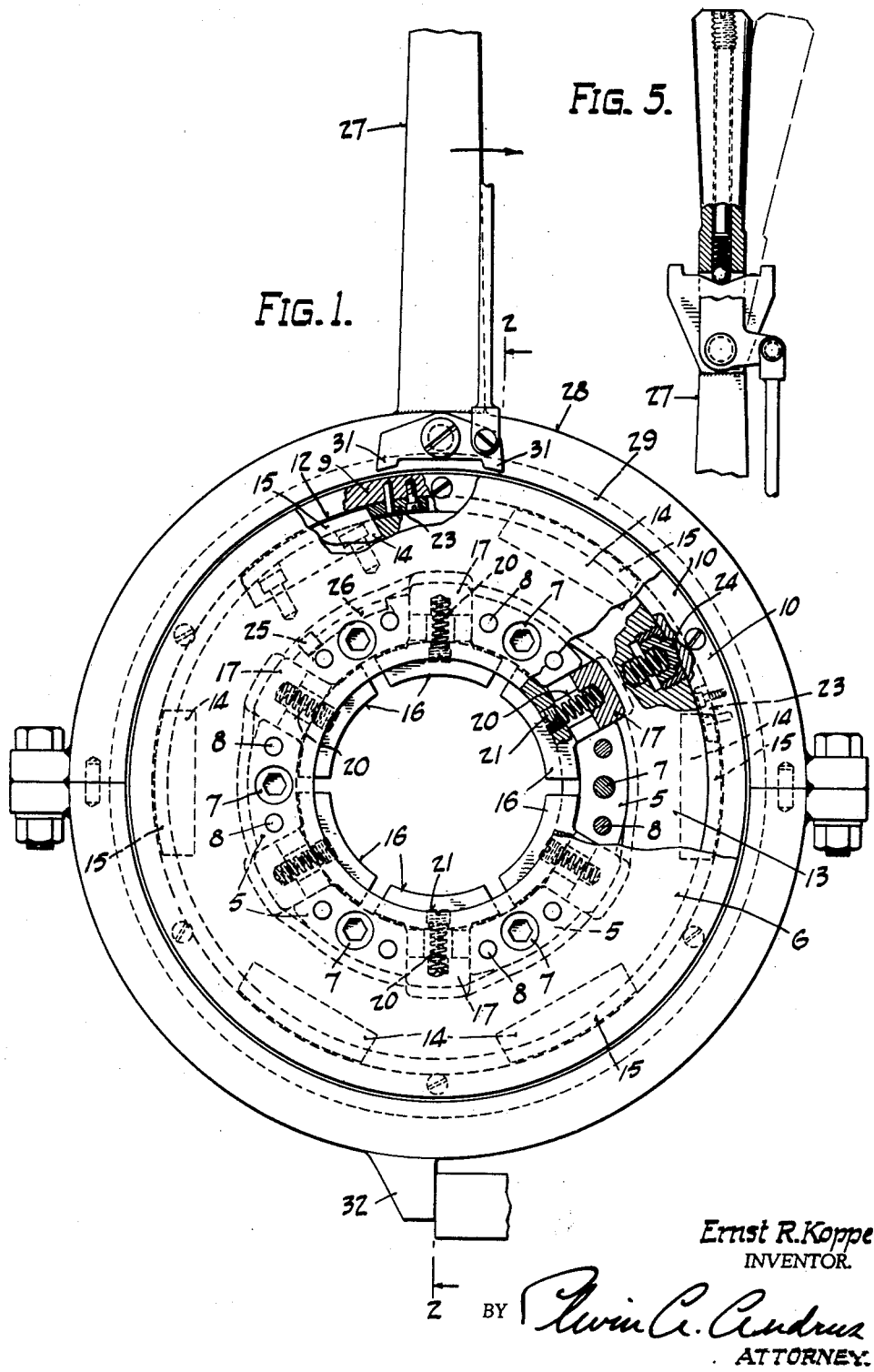
Ernst R. Koppel
INVENTOR.

Sept. 3, 1946.                    E. R. KOPPEL                    2,407,083
                                     CHUCK
                              Filed March 11, 1944                4 Sheets-Sheet 2
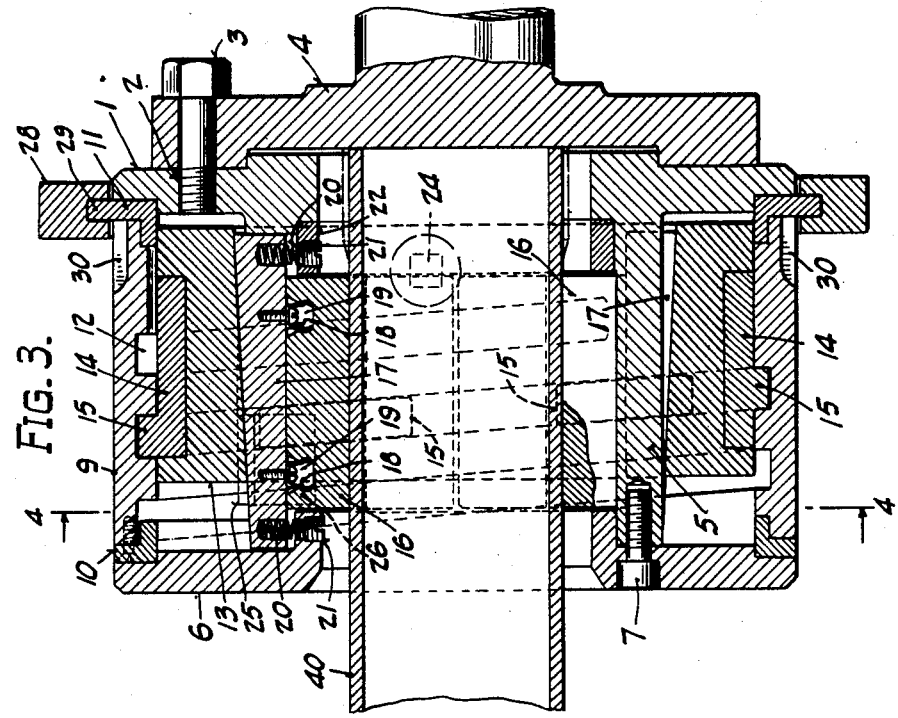
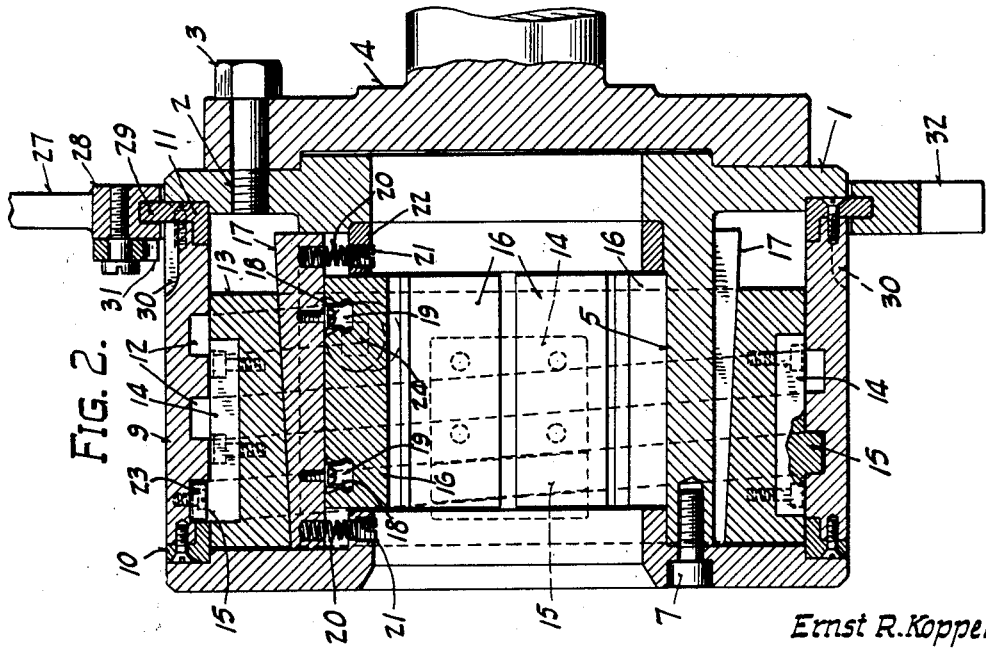
Ernst R. Koppel
INVENTOR.
BY *[signature]*
ATTORNEY.

Sept. 3, 1946.  E. R. KOPPEL  2,407,083
CHUCK
Filed March 11, 1944  4 Sheets-Sheet 3

Ernst R. Koppel
INVENTOR.
BY
ATTORNEY.

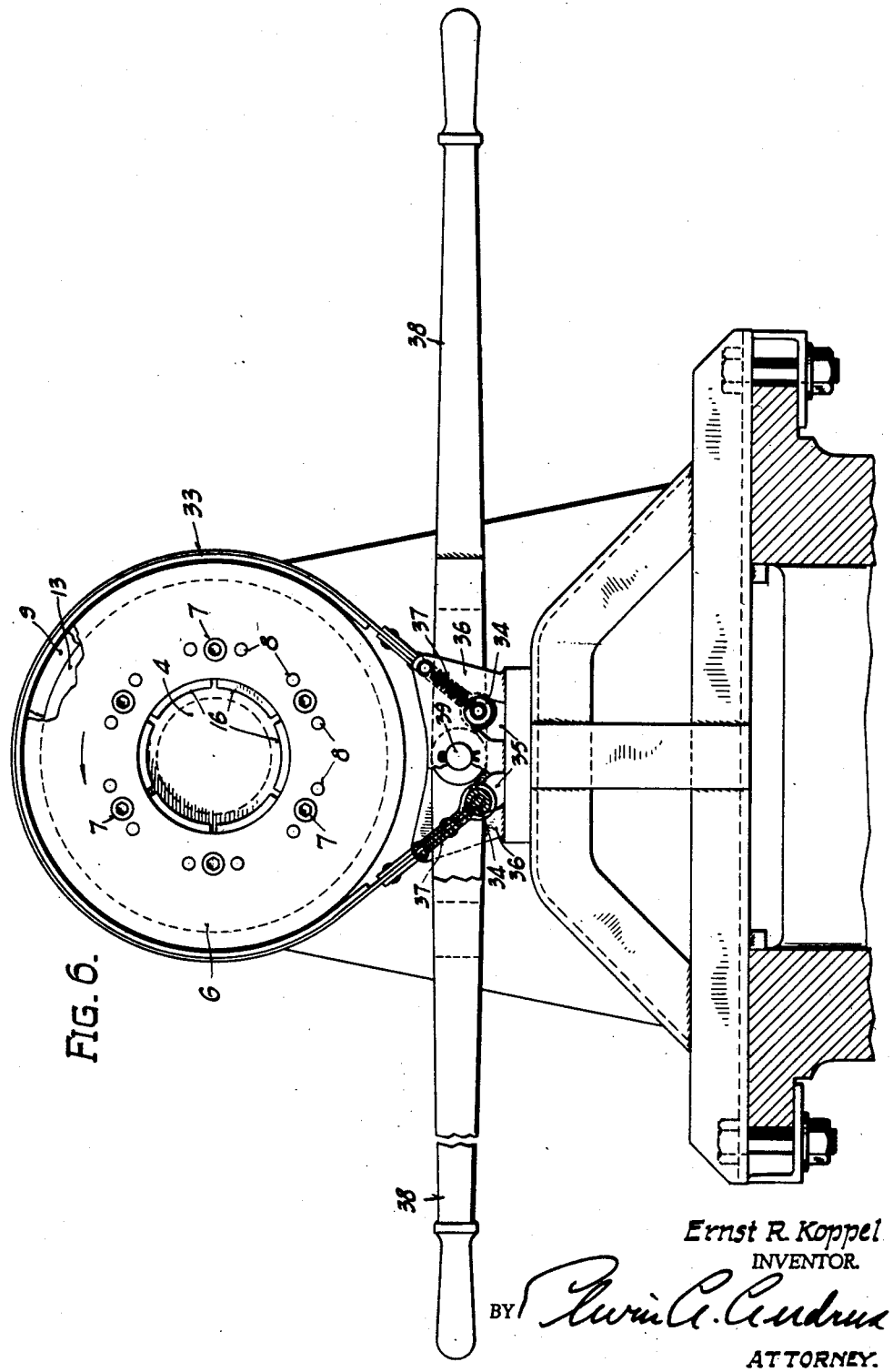

Patented Sept. 3, 1946

2,407,083

UNITED STATES PATENT OFFICE 2,407,083

CHUCK

Ernst R. Koppel, Milwaukee, Wis., assignor to A. O. Smith Corporation, Milwaukee, Wis., a corporation of New York Application March 11, 1944, Serial No. 525,992

10 Claims. (Cl. 279—74)

This invention relates to a chuck of the quick opening type. It has been applied to chucks having jaws that move radially through a substantial distance and employed to grip cylindrical work pieces for turning the same in forming operations such as that set forth in U. S. Patent No. 2,309,561.

One of the objects of the invention is to provide a quick opening chuck of greater holding power and which has a wider operative range of jaw movement.

Another object is to provide a simple, more compact and efficient quick opening chuck of high power.

Another object is to provide a chuck having less maintenance cost and which can be constructed more economically.

Another object is to provide a chuck with a wide opening range and great holding power and which can be operated manually with almost instantaneous action.

Another object is to provide a chuck with readily interchangeable clamping jaws allowing for a wide range of use.

Another object is to provide a chuck with great holding power and with jaws designed in such a manner that they will not mar the work.

Another object is to provide a chuck which will not only allow for considerable torsion load but also endwise or axial load.

An embodiment of the invention is illustrated in the accompanying drawings in which:

Figure 1 is a front elevation of the chuck in open position, parts being shown in section;

Fig. 2 is a vertical central section taken on line 2—2 of Fig. 1 with the chuck open;

Fig. 3 is a section similar to Fig. 2 showing the chuck closed on a blank;

Fig. 5 is a detail showing of the manual operating lever; and

Fig. 6 is a detail showing of a modified type of manual operating lever employing a brake band and utilizing the power of the main drive motor for the work spindle to open and close the chuck.

Figure 4:
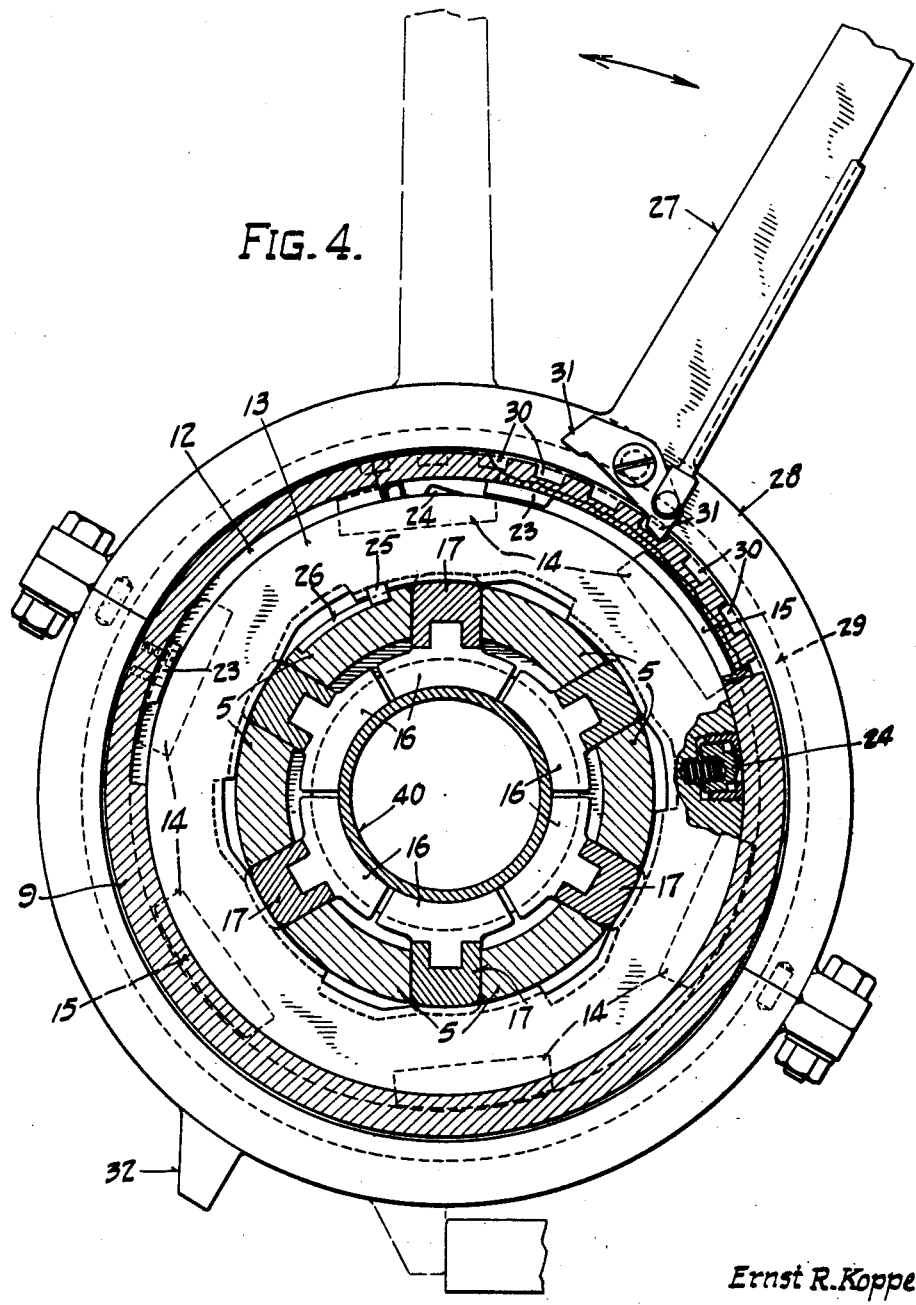
Fig. 4 is a vertical transverse section taken on line 4—4 of Fig. 3, parts being broken away.

In carrying out the invention the clamping shoes are supported and moved radially into and out of clamping position by a threaded member having an inclined inner surface which moves axially against the shoes. Quick relief is obtained through radial cam surfaces on the inclined surfaces engaging the shoes so that relative rotation over a very short distance between the threaded member and the shoes without concurrent longitudinal movement of the sleeve produces a rapid movement of the shoes while subsequent longitudinal movement of the threaded member provides the desired gripping pressure.

The chuck has a base plate 1 at its rear end with threaded holes 2 for receiving bolts 3 which secure the same to a rotary support 4. The plate 1 has forwardly extending fingers 5 to the end of which an end plate 6 is secured by screws 7. Dowel pins 8 on opposite sides of screws 7 assist in taking the torque load.

The gripping mechanism of the chuck is mounted between the plates 1 and 6, and comprises an outer casing 9 having bearing rings 10 and 11 or other suitable bearing means secured thereto and a large internal square thread or spiral groove 12 on its inner surface. A cam ring 13 is disposed for axial movement in the casing 9 and has a plurality of outer shoes 14 with projections 15 forming a spiral and engaging in the spiral groove 12 in the casing to determine the longitudinal position of the ring by threading of the projections in the groove when the ring 13 and casing 9 are relatively rotated.

The inside surface of the cam ring 13 is shaped to engage and control the radial movement of a plurality of gripping jaws 16 which are arranged in circular formation for gripping a pipe or similar article. The jaws 16 are removably mounted on and keyed to actuating blocks 17 by means of spring clips 18 secured to the latter and entering recesses 19 in the respective jaws. The blocks 17 are disposed in slots between fingers 5 and held against radial inward movement by means of compression springs 20 disposed at their ends. The springs 20 are held in place by screw plugs 21 threaded against the inner ends of the springs, while the outer ends of the springs are disposed in recesses in the blocks 17. The screw plugs 21 at the front end of the chuck are threaded into openings in a cylindrical flange of the end plate 6. The screw plugs 21 at the rear end of the chuck are threaded into a ring 22 on the inside of fingers 5 and abutting plate 1.

The inner cam surface of ring 13 engaged by blocks 17 is of a compound nature. The ring is substantially shorter than the distance between plates 1 and 6 and its inner surface is tapered longitudinally with a corresponding taper on the outer surfaces of blocks 17, so that when the ring is moved longitudinally toward the rear by rotation of outer casing 9 it wedges the blocks radially inwardly against springs 20 to effect gripping of the article. Likewise, when the ring is moved longitudinally in the opposite direction it releases the blocks and allows springs 20 to force them radially outward.

The ring 13 is mounted for limited rotation in unison with outer casing 9 and relative to the blocks 17, and that portion of the ring surface traversed by each block is cam formed to effect rapid radial movement of the block when the ring 13 and casing 9 are rotated in unison. Rotation in one direction effects the rapid radial inward movement of all of the blocks to the same extent to bring the jaws into closeness with the work. Subsequent longitudinal movement of the ring by relative rotation with casing 9 applies the wedging action resulting in a tight gripping of the work by the jaws. In this way a coarse and a fine cam movement is obtained that provides a wide opening for the chuck to receive an article with quick closing of the jaws thereon and a very high holding power in the actual gripping range.

The cam ring 13 is moved by rotation of the outer casing 9. In the chuck illustrated, both rotary and longitudinal movement of the ring are obtained by the same rotation of the casing. The longitudinal movement of the ring 13 is effected by the projections 15 on the shoes 14 riding in the spiral grooves 12.

Rotation of the casing 9 relative to ring 13 threads the projections along the groove and effects the desired longitudinal movement of the cam ring. The threading action referred to is limited by two stop blocks 23 secured in groove 12 near its opposite ends so that the ring does not wedge against the end plates 1 and 6.

Rotation of the casing 9 effects rotation of the cam ring by means of a spring pressed detent 24 interlocking the adjacent surfaces of the two. A key 25 secured to the cam ring 13 and operating freely in a groove 26 in one of the fingers 5 limits the amount of rotation of the ring relative to the fingers and clamping members, and thereby effects operation of the detent to free the interlock between the casing 9 and ring 13 when the latter has reached the limit of its permissible rotary movement in either direction.

Rotation of casing 9 can be effected in various ways. In Figs. 1 to 5 a hand ratchet lever 27 is provided. The lever 27 is mounted on a rotatable ring member 28 encircling a flange 29 on the bearing ring 11. Ratchet recesses 30 are provided in the outer surface of casing 9 for receiving the pawls 31 which are operated by the lever 27, a pawl being provided for each direction of rotation. A stop 32 may be provided on member 28 to engage an abutment and prevent the member from revolving with the chuck during working operations.

Another means for operating the chuck is illustrated in Fig. 6 in which a brake band 33 is employed to hold the casing 9 still while plate 1 and its gripping mechanism are rotated by the power means of spindle support 4, rotation of which must be reversible in this particular application. The brake band 33 encircles casing 9 and has its ends secured to separate transverse rods 34 which are held in slots 35 in two fixed side plates 36. The rods 34 are normally held against the upper ends of the slots 35 by means of springs 37 so that the band is loose on the casing 9.

A balanced lever 38 extends across the top of the rods 34 between side plates 36 and is pivoted at its center to a rod 39 secured between the side plates and located above the rods 34 and on a vertical plane intermediate the same. The lever 38 extends in opposite directions for operation of the chuck from either side. The lever has a notch for receiving each of the rods 34.

When the lever 38 is pivoted in one direction, it serves to lower rod 34 on the down-side against the springs 37 on that side and to tighten the brake band 33 against turning of the casing 9 in one direction. When the lever is pivoted in the opposite direction, it serves to lower the other rod 34 against its springs 37 and to tighten the brake band against turning of the casing in the opposite direction. In each case the direction of tightening of the band should be such that the pull thereon by the rotation of casing 9 will be against the respective rod 34 that is against the top of its slot at the time. Release of lever 38 allows it to return to neutral position by reason of the tension of springs 37.

The chuck provides a quick opening and closing for the jaws through a large radial travel so that workpieces with shoulders larger than the diameter to be gripped can be taken care of and at the same time ease of insertion and withdrawal of work is established without loss of time. Apart from the large opening, the operation of this chuck is by far faster than that of similar power operated conventional chucks.

In operation, after insertion of the work 40 casing 9 and cam ring 13 are rotated in unison relative to plate 1 by suitable mechanism such as the devices of Figs. 1, 5 and 6, to effect a rotation of cam ring 13 relative to plate 1 and in a direction that rapidly moves the blocks 17 and gripping jaws 16, carried thereby, inwardly toward the work and against the pressure of the springs 20. When key 25 has reached the limit of its movement in groove 26 the cam ring 13 can no longer be rotated relative to plate 1 and detent 24 will be forced out of the way to allow casing 9 to rotate relative to ring 13. This relative rotation between casing 9 and ring 13 effects longitudinal movement of the latter resulting in a wedging of the gripping jaws 16 against the work.

Release of the work is obtained by relatively rotating casing 9 and plate 1 in the opposite direction from that employed in tightening. In this operation is makes little difference which movement of the cam ring 13 takes place first. If the cam ring 13 rotates first it will, upon key 25 reaching the end of its slot, move longitudinally until the blocks 17 are fully released. If the cam ring 13 moves longitudinally first it will, upon projection 15 engaging the forward stop block 23, rotate until blocks 17 are fully released. In the fully released position, detent 24 interlocks the casing 9 and cam ring 13.

Considering its overall size the chuck has an exceedingly high gripping power for transmission of heavy torque loads to a cylindrical workpiece. The area of grip of jaws 16 on the work is large and the keying of the jaws to the blocks 17 disposed directly between the fingers 5 enables the transmission of the torque loads. Jaws 16 can be readily removed and replaced for different size work. Actual operation of the chuck from fully open to fully closed position or vice versa if a hand brake as shown in Fig. 6 is utilized may require less than one second depending on the speed of spindle 4.

The invention may have various embodiments within the scope of the accompanying claims.

I claim:

1. A chuck comprising a plurality of opposed radially movable gripping jaws, a cam ring encircling said jaws with axial and circumferential cam surfaces engaging the same and relatively movable with respect thereto in both a rotary and an axial direction to effect gripping movement of said jaws, a single rotary actuating member encircling said cam ring for producing relative rotation between said ring and jaws and relative axial movement between the same, and a releasable interlock between said cam ring and said actuating member to effect substantial completion of the relative rotation of said cam ring and jaws prior to the relative axial movement of the same.

2. A chuck comprising a plurality of opposed radially movable gripping jaws, a cam ring encircling said jaws with axial and circumferential cam surfaces engaging the same and relatively movable with respect thereto in both a rotary and an axial direction to effect gripping movement of said jaws, a single rotary actuating member encircling said cam ring for producing relative rotation between said ring and jaws and relative axial movement between the same, a releasable spring pressed detent interlocking said cam ring and said actuating member to effect substantial completion of the relative rotation of said cam ring and jaws prior to the relative axial movement of the same, and interengaging stop means on said cam ring and at least one of said jaws for effecting the release of said detent upon rotation of said actuating member after completion of said relative rotational movement between said cam ring and jaws.

3. A chuck comprising a frame having a pair of spaced end plates joined by longitudinally extending spaced bars disposed in a circle, a plurality of radially movable gripping jaws operable in the spaces between said bars and extending between said end plates, and a cam ring circumferentially adjacent said bars and jaws and having cam surfaces for operating said jaws radially upon relative rotational and axial movement between said ring and jaws.

4. A chuck comprising a frame having a pair of spaced end plates joined by longitudinally extending spaced bars disposed in a circle, a plurality of radially movable gripping jaws operable in the spaces between said bars and extending between said end plates, and a cam ring circumferentially adjacent said bars and jaws and having cam surfaces for operating said jaws radially upon relative rotational and axial movement between said ring and jaws, and means biasing said gripping jaws radially against the respective cam surfaces.

5. A chuck comprising a frame having a pair of spaced end plates joined by longitudinally extending spaced bars disposed in a circle about the chuck opening, a plurality of radially movable gripping jaws operable in the spaces between said bars and extending between said end plates, springs for biasing said jaws radially outward, a cam ring encircling said bars and jaws and having internal cam surfaces for operating said jaws radially inward against said springs upon relative rotational and axial movement between said ring and jaws, and means to effect relative rotational and axial movement between said ring and jaws.

6. A chuck comprising a frame having a pair of spaced end plates joined by longitudinally extending spaced bars disposed in a circle about the chuck opening, a plurality of radially movable gripping jaws operable in the spaces between said bars and extending between said end plates, springs for biasing said jaws radially outward, a cam ring encircling said bars and jaws and having internal cam surfaces for operating said jaws radially inward against said springs upon relative rotational and axial movement between said ring and jaws, a shell surrounding said ring and rotatable relative to said frame, means for temporarily interlocking said shell and ring to effect rotation of the latter with the former, and spirally inter-engaging means at the adjacent surfaces of the shell and ring to effect longitudinal movement of said ring upon relative rotation between the shell and ring.

7. A chuck comprising a frame having a pair of spaced end plates joined by longitudinally extending spaced bars disposed in a circle about the chuck opening, a plurality of radially movable gripping jaws operable in the spaces between said bars and extending between said end plates, springs for biasing said jaws radially outward, a cam ring encircling said bars and jaws and having internal cam surfaces for operating said jaws radially inward against said springs upon relative rotational and axial movement between said ring and jaws, a shell surrounding said ring and rotatable relative to said frame, means for temporarily interlocking said shell and ring to effect rotation of the latter with the former, spirally inter-engaging means at the adjacent surfaces of the shell and ring to effect longitudinal movement of said ring upon relative rotation between the shell and ring, and means for effecting relative rotation between said shell and frame.

8. A chuck comprising a frame having a pair of spaced end plates joined by longitudinally extending spaced bars disposed in a circle about the chuck opening, a plurality of radially movable gripping jaws operable in the spaces between said bars and extending between said end plates, springs for biasing said jaws radially outward, a cam ring encircling said bars and jaws and having internal cam surfaces for operating said jaws radially inward against said springs upon relative rotational and axial movement between said ring and jaws, a shell surrounding said ring and rotatable relative to said frame, means for temporarily interlocking said shell and ring to effect rotation of the latter with the former, spirally interengaging means at the adjacent surfaces of the shell and ring to effect longitudinal movement of said ring upon relative rotation between the shell and ring, and a ratchet mounted on said chuck for effecting relative rotation between said shell and frame.

9. A chuck comprising a frame having a pair of spaced end plates joined by longitudinally extending spaced bars disposed in a circle about the chuck opening, a plurality of radially movable gripping jaws operable in the spaces between said bars and extending between said end plates, springs for biasing said jaws radially outward, a cam ring encircling said bars and jaws and having internal cam surfaces for operating said jaws radially inward against said springs upon relative rotational and axial movement between said ring and jaws, a shell surrounding said ring and rotatable relative to said frame, means for temporarily interlocking said shell and ring to effect rotation of the latter with the former, spirally inter-engaging means at the adjacent surfaces of the shell and ring to effect longitudinal movement of said ring upon relative rotation between the shell and ring, a brake band encircling said shell, and means for tightening the same to hold said shell against rotation while said frame is rotated to effect operation of said chuck.

10. In a chuck of the class described, a plurality of circumferentially disposed radially movable gripping jaws, a similar number of actuating blocks disposed to support said jaws, a spring clip connection between the respective jaws and blocks to provide for ready individual attachment and removal of said jaws to and from said blocks, and interlocking means between said jaws and their respective blocks separate from said connections to transmit torque load therebetween.

ERNST R. KOPPEL.